(12) United States Patent
Chen et al.

(10) Patent No.: US 11,366,445 B2
(45) Date of Patent: Jun. 21, 2022

(54) EQUIPMENT UNIT STATE CONTROLLING METHOD AND DEVICE, AND EQUIPMENT UNIT

(71) Applicant: Gree Electric Appliances, Inc. of Zhuhai, Guangdong (CN)

(72) Inventors: Wanxing Chen, Guangdong (CN);
Yuhong Dong, Guangdong (CN);
Zhengqing Tang, Guangdong (CN);
Baolin Zhou, Guangdong (CN);
Guiqing Lin, Guangdong (CN);
Baolong Wu, Guangdong (CN)

(73) Assignee: Gree Electric Appliances, Inc., Guangdong (CN)

( * ) Notice: Subject to any disclaimer, the term of this patent is extended or adjusted under 35 U.S.C. 154(b) by 169 days.

(21) Appl. No.: 16/962,339

(22) PCT Filed: Dec. 12, 2018

(86) PCT No.: PCT/CN2018/120591
§ 371 (c)(1),
(2) Date: Jul. 15, 2020

(87) PCT Pub. No.: WO2019/141024
PCT Pub. Date: Jul. 25, 2019

(65) Prior Publication Data
US 2020/0341445 A1 Oct. 29, 2020

(30) Foreign Application Priority Data
Jan. 22, 2018 (CN) .......................... 201810059370.0

(51) Int. Cl.
*G05B 19/10* (2006.01)
*G05B 19/042* (2006.01)

(52) U.S. Cl.
CPC ....... *G05B 19/104* (2013.01); *G05B 19/0423* (2013.01); *G05B 2219/25257* (2013.01)

(58) Field of Classification Search
CPC ............ G05B 19/0423; G05B 19/0428; G05B 19/058; G05B 19/104; G05B 2219/25257; G05B 2219/2613
See application file for complete search history.

(56) References Cited

U.S. PATENT DOCUMENTS

2007/0012052 A1* 1/2007 Butler ..................... F25B 49/02
62/181
2016/0282828 A1* 9/2016 Jauquet ................ G05B 19/042

FOREIGN PATENT DOCUMENTS

CN 102480497 A 5/2012
CN 104456868 A 3/2015
(Continued)

*Primary Examiner* — Afroza Chowdhury
(74) *Attorney, Agent, or Firm* — The Webb Law Firm (57) ABSTRACT

An equipment unit state controlling method and device, and an equipment unit. After receiving control data transmitted from a state controller, a unit controller detects whether the unit controller communicates with a display panel controller, in which the state controller transmits the control data to the unit controller and the display panel controller simultaneously. If the unit controller communicates with the display panel controller, the unit controller performs an operation on the equipment unit corresponding to instruction information transmitted from the display panel controller, and if the unit controller does not communicate with the display panel controller, the unit controller parses the control data by itself to obtain the parsing result and performs the operation on the equipment unit corresponding to the parsing result.

10 Claims, 5 Drawing Sheets

(56) References Cited

FOREIGN PATENT DOCUMENTS

| | | |
|---|---|---|
| CN | 104536405 A | 4/2015 |
| CN | 104566858 A | 4/2015 |
| CN | 106152386 A | 11/2016 |
| CN | 106196458 A | 12/2016 |
| CN | 108279595 A | 7/2018 |
| EP | 0978774 A1 | 2/2000 |

* cited by examiner

EQUIPMENT UNIT STATE CONTROLLING METHOD AND DEVICE, AND EQUIPMENT UNIT

CROSS REFERENCE TO RELATED APPLICATIONS

The present application is a U.S. National Stage Application under 35 U.S.C. § 371 of International Patent Application No. PCT/CN2018/120591, filed on Dec. 12, 2018, which is based on and claims priority from CN application No. 201810059370.0, filed on Jan. 22, 2018, the disclosure of both of which are hereby incorporated into this disclosure by reference in its entirety.

BACKGROUND OF THE INVENTION

Field of the Invention

The present disclosure relates to the field of control, and in particular, to a method and a device for controlling a state of an equipment unit, and an equipment unit.

Description of Related Art

At present, when the time limit of use of the equipment unit is set, a user can directly control a unit controller through a display panel.

SUMMARY OF THE INVENTION

According to a first aspect of an embodiment of the present disclosure, there is provided a method for controlling a state of an equipment unit performed by an unit controller comprising: detecting whether the unit controller communicates with a display panel controller after receiving control data transmitted from a state controller, wherein the control data are also transmitted from the state controller to the display panel controller; performing an operation corresponding to instruction information transmitted from the display panel controller on the equipment unit in a case where the unit controller communicates with the display panel controller, wherein the instruction information corresponds to a first parsing result obtained by the display panel controller parsing the control data; and parsing the control data to obtain a second parsing result in a case where the unit controller does not communicate with a display panel controller, and performing an operation corresponding to the second parsing result on the equipment unit.

In some embodiments, the performing the operation corresponding to the second parsing result comprises: extracting delay information from the second parsing result in a case where the control data are unit encryption instruction information; performing a delay process corresponding to the delay information; and locking the equipment unit after the delay process.

In some embodiments, transmitting a current remaining delay information to the display panel controller for the display panel controller to use the remaining delay information to continue the delay process in a case where a communication between the unit controller and the display panel controller is recovered during the delay process; and locking the equipment unit after receiving a locking instruction transmitted from the display panel controller, wherein the locking instruction is transmitted after the display panel controller finishes the delay process.

In some embodiments, unlocking the equipment unit in a case where the control data are unit decryption instruction information.

In some embodiments, the performing an operation corresponding to instruction information comprises: locking the equipment unit in a case of receiving a locking instruction transmitted from a display panel controller; and unlocking the equipment unit in a case of receiving an unlocking instruction transmitted from the display panel controller.

In some embodiments, receiving the remaining delay information transmitted from the display panel controller at a predetermined cycle during the delay process.

In some embodiments, continuing the delay process according to the last received remaining delay information in a case where the unit controller does not communicate with the display panel controller in a process of waiting for receiving the locking instruction transmitted from the display panel controller; and locking the equipment unit after the delay process.

According to a second aspect of an embodiment of the present disclosure, there is provided a unit controller for controlling a state of an equipment unit comprising: a receiving module configured to receive control data transmitted from a state controller, wherein the control data are also transmitted from the state controller to the display panel controller; a detection module configured to detect whether the unit controller communicates with a display panel controller after receiving the control data; and an operation module configured to perform an operation corresponding to instruction information transmitted from the display panel controller on the equipment unit in a case where the unit controller communicates with the display panel controller, wherein the instruction information corresponds to a first parsing result obtained by the display panel controller parsing the control data, parse the control data to obtain a second parsing result in a case where the unit controller does not communicate with a display panel controller, and perform an operation corresponding to the second parsing result on the equipment unit.

In some embodiments, the operation module is configured to extract delay information from the second parsing result in a case where the control data are unit encryption instruction information, perform a delay process corresponding to the delay information, and lock the equipment unit after the delay process.

In some embodiments, the operation module is configured to transmit a current remaining delay information to the display panel controller for the display panel controller to use the remaining delay information to continue the delay process in a case where a communication between the unit controller and the display panel controller is recovered during the delay process, and lock the equipment unit after receiving a locking instruction transmitted from the display panel controller, wherein the locking instruction is transmitted after the display panel controller finishes the delay process.

In some embodiments, the operation module is configured to unlock the equipment unit in a case where the control data are unit decryption instruction information.

In some embodiments, the operation module is configured to lock the equipment unit in a case of receiving a locking instruction transmitted from a display panel controller, and unlock the equipment unit in a case of receiving an unlocking instruction transmitted from the display panel controller.

In some embodiments, the operation module is configured to receive the remaining delay information transmitted from the display panel controller at a predetermined cycle during the delay process.

In some embodiments, the operation module is configured to continue the delay process according to the last received remaining delay information in a case where the unit controller does not communicate with the display panel controller in a process of waiting for receiving the locking instruction transmitted from the display panel controller, and lock the equipment unit after the delay process.

According to a third aspect of an embodiment of the present disclosure, there is provided a unit controller for controlling the state of an equipment unit, comprising: a memory configured to store instructions; a processor coupled to the memory and configured to: detect whether the unit controller communicates with a display panel controller after receiving control data transmitted from a state controller, wherein the control data are also transmitted from the state controller to the display panel controller; perform an operation corresponding to instruction information transmitted from the display panel controller on the equipment unit in a case where the unit controller communicates with the display panel controller, wherein the instruction information corresponds to a first parsing result obtained by the display panel controller parsing the control data; and parse the control data to obtain a second parsing result in a case where the unit controller does not communicate with a display panel controller, and performing an operation corresponding to the second parsing result on the equipment unit.

According to a fourth aspect of an embodiment of the present disclosure, there is provided an equipment unit comprising: the unit controller of any one of the above embodiments; a state controller configured to transmit control data to the unit controller and a display panel controller; and the display panel controller configured to parse the control data to obtain a first parsing result in a case where the display panel controller communicates with the unit controller, and transmit instruction information corresponding to the first parsing result to the unit controller.

In some embodiments, the display panel controller is configured to perform a delay process corresponding to delay information extracted from the control data in a case where the control data are unit encryption instruction information, and transmit the locking instruction to the unit controller after the delay process.

In some embodiments, the display panel controller is configured to transmit the unlocking instruction in a case where the control data are unit decryption instruction information.

According to a fifth aspect of an embodiment of the present disclosure, there is provided a non-transitory computer-readable storage medium, wherein the computer-readable storage medium stores computer instructions which, when executed by a processor, implement the method according to any one of the embodiments.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. Apparently, the drawings in the following description are only some of the embodiments of the present disclosure, and for those skilled in the art, other drawings may also be obtained according to the drawings without inventive labor.

DESCRIPTION OF THE INVENTION

The technical solutions in the embodiments of the present disclosure will be described clearly and completely with reference to the drawings in the embodiments of the present disclosure, and it is obvious that the embodiments described are only some, instead of all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without inventive step, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that the sizes of the respective portions shown in the drawings are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once an item is defined in one figure, so it need not be discussed further in subsequent figures.

The inventors have found through research that when the display panel is damaged or abnormal, a user cannot operate the equipment unit through the display panel.

Therefore, the present disclosure provides a solution capable of operating the equipment unit when the display panel is damaged or abnormal.

Figure 1:
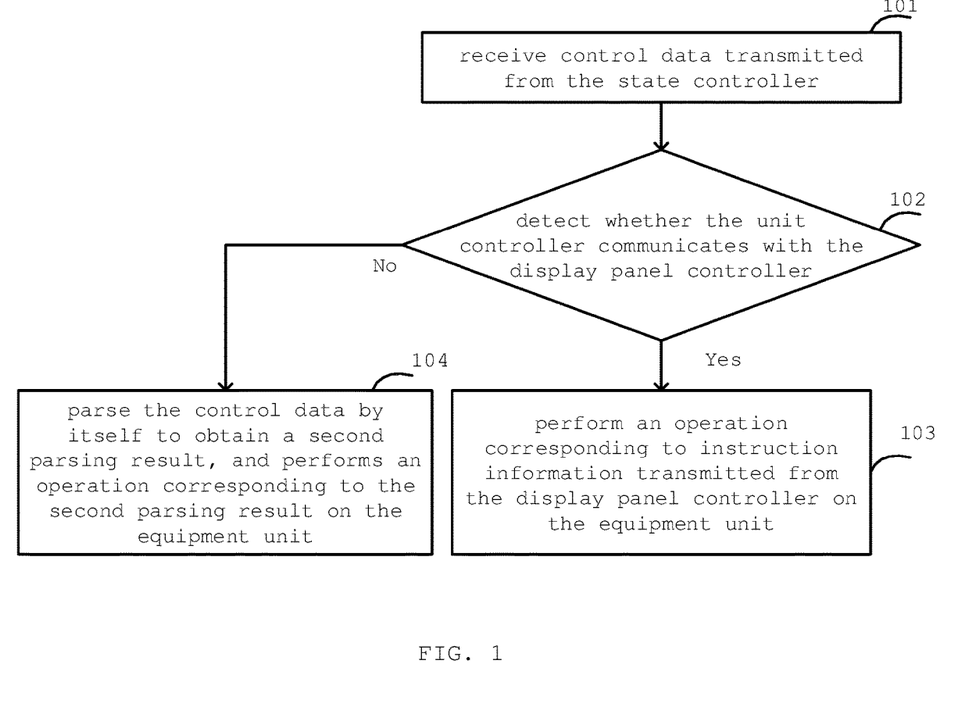
FIG. 1 is an exemplary flow chart of a method for controlling a state of an equipment unit in one embodiment of the present disclosure.

FIG. 1 is an exemplary flowchart of a method for controlling the state of equipment unit according to one embodiment of the present disclosure. For example, the equipment unit may be an air conditioning unit, intelligent equipment unit, or industrial equipment.

In step 101, the unit controller receives control data transmitted from the state controller.

It should be noted that the state controller simultaneously transmits the control data to the unit controller and a display panel controller.

In step 102, the unit controller detects whether the unit controller communicates with the display panel controller.

If the unit controller communicates with the display panel controller, step 103 is executed. If the unit controller does not communicate with a display panel controller, step 104 is executed.

For example, the unit controller detects a heartbeat signal transmitted from the display panel controller at a predetermined frequency. If the heartbeat signal is not received within 30 seconds, it can be determined that the display panel has a failure of transmission and normal communication cannot be performed.

In step 103, the unit controller performs an operation corresponding to instruction information transmitted from the display panel controller on the equipment unit.

The display panel controller parses the control data to obtain a first parsing result and transmits the instruction information corresponding to the first parsing result to the unit controller.

In step 104, the unit controller parses the control data by itself to obtain a second parsing result, and performs an operation corresponding to the second parsing result on the equipment unit.

Based on the solution provided by the above embodiment of the present disclosure, the state controller transmits the control data to the unit controller and the display panel controller at the same time. In a case where the unit controller can communicate with a display panel controller, the unit controller does not process the control data itself, and only performs the operation corresponding to the indication information transmitted from the display panel controller. The unit controller processes the control data by itself only in a case where the unit controller does not communicate with the display panel controller. Therefore, in a case where the display panel has a fault, the equipment unit can be controlled. In addition, the relevant processing can be handed from the unit controller to the display panel controller for operation, thereby effectively relieving the load pressure of the unit controller.

Figure 2:
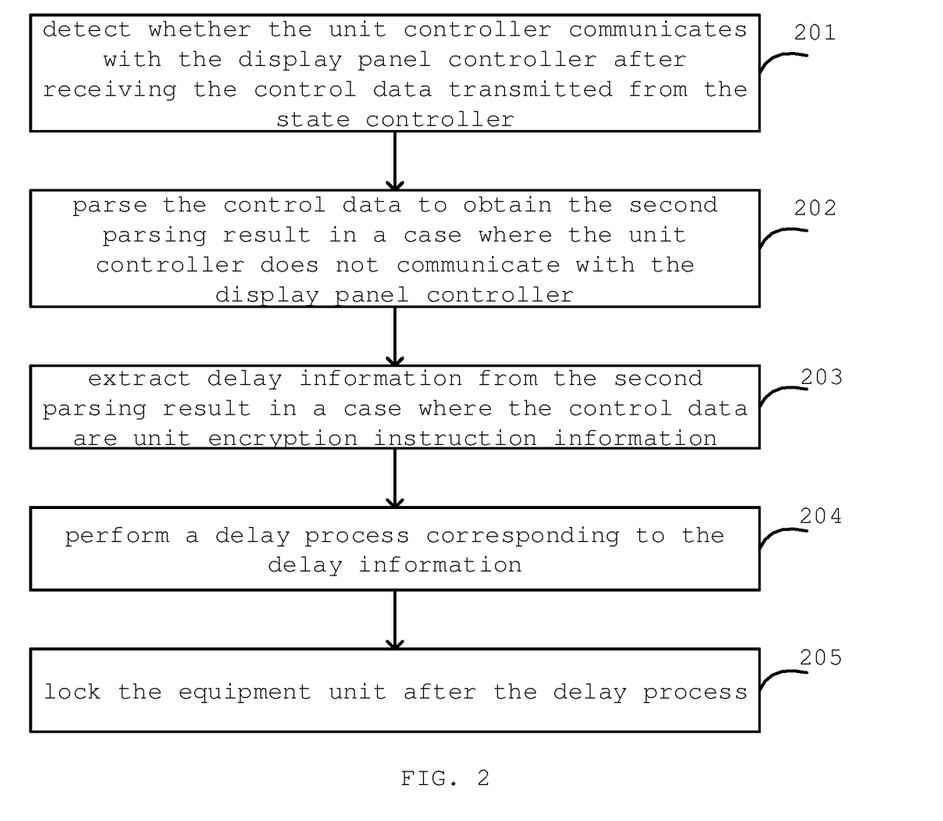
FIG. 2 is an exemplary flow chart of a method for controlling the state of an equipment unit according to another embodiment of the present disclosure.

FIG. 2 is an exemplary flowchart of a method for controlling a plant crew state according to another embodiment of the present disclosure.

In step 201, the unit controller detects whether the unit controller communicates with the display panel controller after receiving the control data transmitted from the state controller.

In step 202, the unit controller parses the control data to obtain the second parsing result in a case where the unit controller does not communicate with the display panel controller.

In step 203, the unit controller extracts delay information from the second parsing result in a case where the control data are unit encryption instruction information.

In step 204, the unit controller performs a delay process corresponding to the delay information.

For example, a countdown process may be performed to achieve the delay process.

In some embodiments, the format of the delay information may be converted, if desired, to facilitate subsequent delay process.

In step 205, the unit controller locks the equipment unit after the delay process.

In some embodiments, the unit controller transmits the current remaining delay information to the display panel controller in a case which a communication between the unit controller and the display panel controller is recovered during the delay process, so that the display panel controller uses the remaining delay information to continue the delay process.

The display panel controller transmits a locking instruction after the delay process. The unit controller locks the equipment unit after receiving the locking instruction transmitted from the display panel controller.

For example, the instruction received by the unit controller is to lock the equipment unit after 10 hours. Because the unit controller cannot communicate with the display panel controller, the unit controller performs the countdown process by itself. In a case where the countdown reaches 3 hours, it is found that the communication between the unit controller and the display panel controller is recovered, in which case the unit controller transmits the current remaining delay information "3 hours" to the display panel controller, so that the display panel controller starts the countdown from 3 hours. After the countdown is finished, the display panel controller transmits an locking instruction to the unit controller, so that the unit controller performs locking operation according to the locking instruction.

In some embodiments, in a case where the unit controller parses the control data, the unit controller unlocks the equipment unit directly when the control data are the unit decryption instruction information.

In some embodiments, after receiving the control data, the unit controller does not perform any additional processing if the unit controller communicates with the display panel controller, and performs the operation corresponding to the instruction information transmitted from the display panel controller. For example, if the unit controller receives a locking instruction transmitted from the display panel controller, the unit controller locks the equipment unit. And if the unit controller receives an unlocking instruction transmitted from the display panel controller, the unit controller unlocks the equipment unit. The display panel controller performs a delay process according to the delay information extracted from the control data in a case where the control data are the unit encryption instruction information, and transmits a locking instruction to the unit controller after the delay process. The display panel controller transmits an unlocking instruction in a case where the control data are the unit decryption instruction information.

In some embodiments, when the display panel controller performs the delay process, the display panel controller transmits the current remaining delay information to the unit controller at a predetermined period, so that the unit controller knows the current situation of the delay process.

Figure 3:
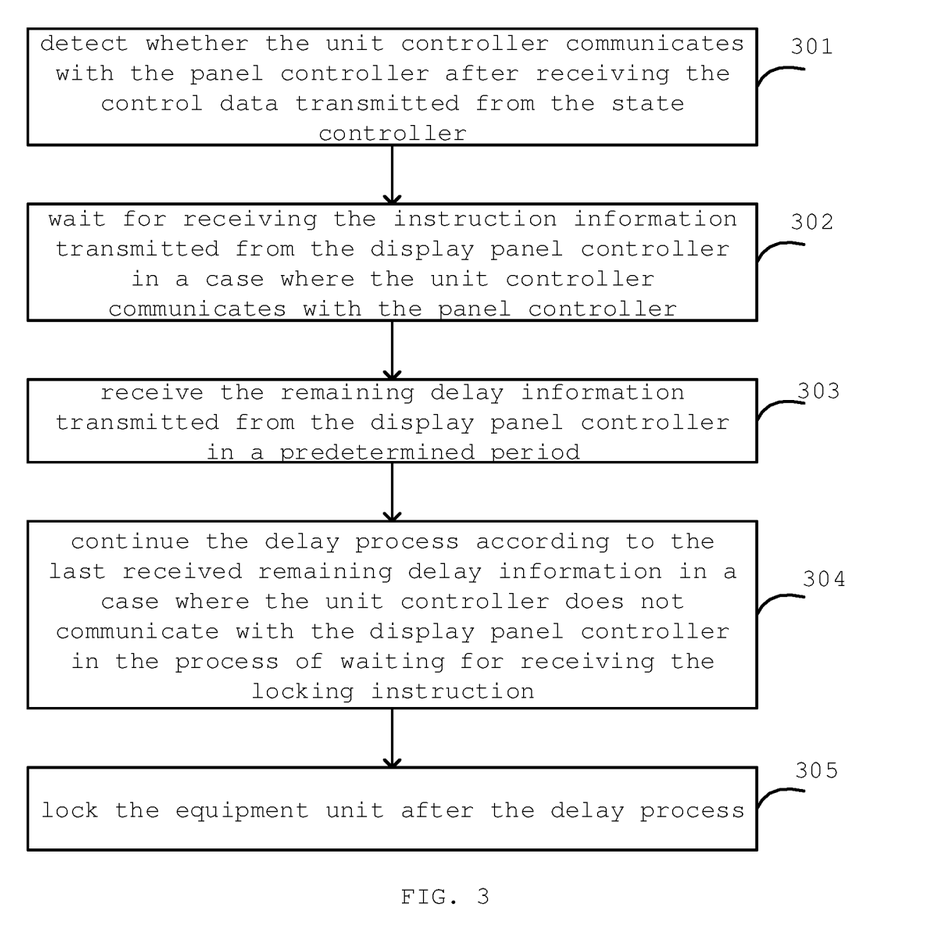
FIG. 3 is an exemplary flow chart of a method for controlling a state of an equipment unit according to still another embodiment of the present disclosure.

FIG. 3 is an exemplary flowchart of a method for controlling a plant crew state according to still another embodiment of the present disclosure.

In step 301, the unit controller detects whether the unit controller communicates with the panel controller after receiving the control data transmitted from the state controller.

In step 302, the unit controller waits for receiving the instruction information transmitted from the display panel controller in a case where the unit controller communicates with the panel controller.

Since the unit controller can communicate normally with the display panel controller, in this case a corresponding parsing operation is performed by the display panel controller.

In step 303, the unit controller receives the remaining delay information transmitted from the display panel controller in a predetermined period.

It should be noted that, if the display panel controller determines to lock the equipment unit according to the first parsing result obtained by the display panel controller parsing the control data, the display panel controller performs the delay process (for example, countdown process), and transmits the current remaining delay information to the unit controller in a predetermined period. The display panel controller transmits the locking instruction to the unit controller after the delay process. And if the display panel controller determines to unlock the equipment unit according to the first parsing result, the display panel controller directly indicates the unit controller to unlock the equipment unit.

In step 304, in the process of waiting for receiving the locking instruction transmitted from the display panel controller, the unit controller continues the delay process according to the last received remaining delay information in a case where the unit controller does not communicate with the display panel controller.

In step 305, the unit controller locks the equipment unit after the delay process.

For example, the state controller instructs the equipment unit to lock after 10 hours. Because the unit controller communicates with the display panel controller, the unit controller does not perform delay process by itself. The display panel controller performs countdown process, and transmits the current remaining delay information to the unit controller every other hour, so that the unit controller knows the currently remaining delay time. In a case where the unit controller not receive the heartbeat signal 7 hours after the countdown process, it indicates that the display panel controller is in failure. In this case, the unit controller performs countdown process for 3 hours according to the last received remaining delay information, and locks the equipment unit after the countdown process.

Therefore, the locking operation of the equipment unit is not affected even if the display panel controller fails in the countdown process.

Figure 4:
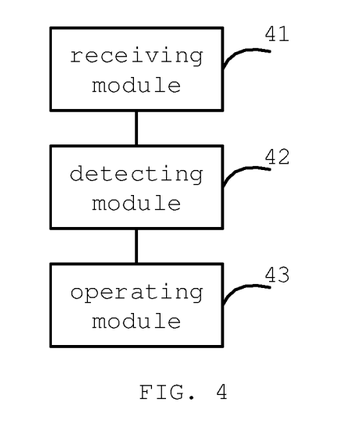
FIG. 4 is an exemplary block diagram of a unit controller for controlling a state of an equipment unit according to one embodiment of the present disclosure.

FIG. 4 is an exemplary block diagram of an unit controller for controlling a state of an equipment unit according to one embodiment of the present disclosure. For example, the equipment unit may be an air conditioning unit, an intelligent equipment unit, or industrial equipment, etc.

As shown in FIG. 4, the unit controller includes a receiving module 41, a detecting module 42, and an operating module 43.

The receiving module 41 is configured to receive control data transmitted from a state controller. The state controller simultaneously transmits the control data to the unit controller and a display panel controller.

The detection module 42 is configured to detect whether the unit controller communicates with a display panel controller after receiving the control data.

The operation module 43 is configured to perform an operation corresponding to instruction information transmitted from the display panel controller on the equipment unit in a case where the unit controller communicates with the display panel controller. The display panel controller parses the control data to obtain the first parsing result, and transmits instruction information to the unit controller according to the first parsing result. The operation module 43 is configured to parse the control data to obtain a second parsing result in a case where the unit controller does not communicate with a display panel controller, and perform an operation corresponding to the second parsing result on the equipment unit.

Based on the solution provided by the above embodiment of the present disclosure, the state controller transmits the control data to the unit controller and the display panel controller at the same time. In a case where the unit controller communicates with a display panel controller, the unit controller does not process the control data itself, and only performs the operation corresponding to the indication information transmitted from the display panel controller. The unit controller processes the control data by itself only in a case where the unit controller does not communicate with the display panel controller. Therefore, in a case where the display panel has a fault, the equipment unit can be controlled. In addition, the relevant processing can be handed from the unit controller to the display panel controller for operation, thereby effectively relieving the load pressure of the unit controller.

In some embodiments, the operation module 43 is configured to extract delay information from the second parsing result in a case where the control data are unit encryption instruction information, perform a delay process corresponding to the delay information, and lock the equipment unit after the delay process. On the other hand, the operation module 43 is configured to unlock the equipment unit in a case where the control data are unit decryption instruction information.

In some embodiments, the operation module 43 is configured to transmit a current remaining delay information to the display panel controller for the display panel controller to use the remaining delay information to continue the delay process in a case where the communication between the unit controller and the display panel controller is recovered during the delay process. the operation module 43 is configured to lock the equipment unit after receiving a locking instruction transmitted from the display panel controller, wherein the locking instruction is transmitted after the display panel controller finishing the delay process.

Namely, in the delay process of the unit controller, if the display panel controller is recovered from the fault, the delay process can be handed to the display panel controller for processing, thereby effectively reducing the load pressure of the unit controller.

In some embodiments, the operation module 43 is configured to lock the equipment unit in a case of receiving a locking instruction transmitted from a display panel controller. The operation module 43 is configured to unlock the equipment unit in a case of receiving an unlocking instruction transmitted from the display panel controller. The display panel controller performs a delay process corresponding to delay information extracted from the control data in a case where the control data are unit encryption instruction information, and transmits the locking instruction to the unit controller after the delay process. The display panel controller transmits the unlocking instruction in a case where the control data are unit decryption instruction information.

In some embodiments, the operation module 43 is further configured to receive the remaining delay information transmitted from the display panel controller at a predetermined cycle during the delay process, so as to know the current delay situation.

In some embodiments, the operation module 43 is further configured to continue the delay process according to the last received remaining delay information in a case where the unit controller does not communicate with the display panel controller in a process of waiting for receiving the locking instruction transmitted from the display panel controller, and lock the equipment unit after the delay process.

That is, if the display panel controller fails during the countdown process, the unit controller can continue the countdown process, thereby ensuring that the system performance is not affected by the failure of the display panel controller.

Figure 5:
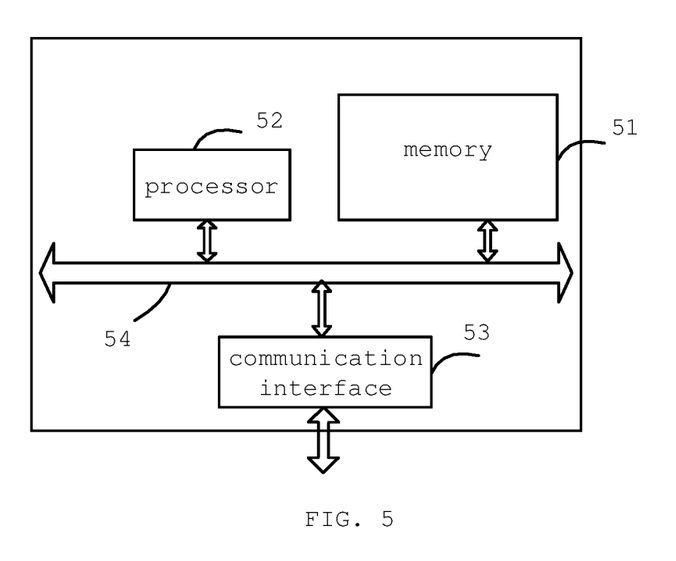
FIG. 5 is an exemplary block diagram of a unit controller for controlling a state of an equipment unit according to another embodiment of the present disclosure.

FIG. 5 is an exemplary block diagram of a unit controller for controlling a state of an equipment unit according to another embodiment of the present disclosure.

As shown in FIG. 5, the unit controller comprises a memory 51 and a processor 52. The memory 51 is used for storing instructions, the processor 52 is coupled to the memory 51, and the processor 52 is configured to execute the method according to any one of FIGS. 1 to 3 based on the instructions stored in the memory.

As shown in FIG. 5, the unit controller further comprises a communication interface 53 for information interaction with other devices. Meanwhile, the unit controller also comprises a bus 54 through which the processor 52, the communication interface 53 and the memory 51 are communicated with each other.

The memory 51 may comprise high-speed RAM memory, and may also include non-volatile memory (non-volatile memory), such as at least one disk memory. The memory 51 may also be a memory array. The storage 51 may also be partitioned and the blocks may be combined into virtual volumes according to certain rules.

Further, the processor 52 may be a central process unit CPU, or may be an application specific integrated circuit ASIC, or one or more integrated circuits configured to implement embodiments of the present disclosure.

The present disclosure also relates to a non-transitory computer-readable storage medium for storing computer instructions which, when executed by the processor, implement the method concerned in any of the embodiments illustrated by FIGS. 1 to 3.

Figure 6:
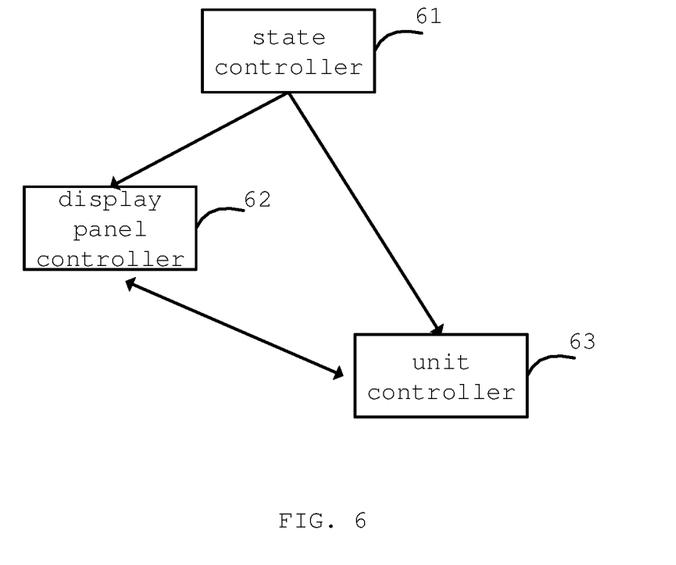
FIG. 6 is an exemplary block diagram of an equipment unit according to another embodiment of the present disclosure.

FIG. 6 is an exemplary block diagram of an equipment unit according to another embodiment of the present disclosure.

As shown in FIG. 6, the equipment unit includes a state controller 61, a display panel controller 62, and a unit controller 63. The unit controller 63 may be the unit controller according to any of the embodiments shown in FIG. 4 or FIG. 5.

The state controller 61 is configured to transmit control data to the unit controller and the display panel controller.

The display panel controller 62 is configured to parse the control data to obtain a first parsing result in a case where the display panel controller communicates with the unit controller, and transmit instruction information corresponding to the first parsing result to the unit controller.

The display panel controller performs the countdown process in a case where the control data indicates to lock the equipment unit, and transmits the locking instruction to the unit controller after the countdown process, so that the unit controller locks the equipment unit. The display panel controller directly transmits the unlocking instruction to the unit controller in a case where the control data indicates to unlock the equipment unit, so that the unit controller unlocks the equipment unit.

During the countdown process, the display panel controller transmits the remaining delay information to the unit controller, so that the unit controller continues the subsequent countdown process when the display panel controller has a failure, and performs locking after the countdown is finished. Therefore, the influence on system control caused by the failure of the display panel controller is effectively avoided.

After receiving the control data, if the communication between the unit controller and the display panel controller is normal, the unit controller does not processes the control data by itself, only performs the operation corresponding to the instruction transmitted from the display panel controller. The unit controller parses the control data in a case where the unit controller does not communicate with the display panel controller. If the control data indicate to lock the equipment unit, the unit controller performs corresponding countdown process, and locks the equipment unit after the countdown process. And if the control data indicate to unlock the equipment unit, the unit controller directly unlocks the equipment unit.

During the unit controller performs countdown process, if the communication between the unit controller and the display panel controller is recovered, the unit controller transmits the current remaining delay information to the display panel controller, so that the display panel controller completes the remaining countdown process. The relevant process can be handed over to the display panel controller for operation, thereby effectively reducing the load pressure of the unit controller.

In some embodiments, the functional unit modules described above can be implemented as a general purpose processor, a Programmable Logic Controller (PLC), a Digital Signal Processor (DSP), an Application Specific Integrated Circuit (ASIC), a Field-Programmable Gate Array (FPGA) or other Programmable Logic device, discrete Gate or transistor Logic, discrete hardware components, or any suitable combination thereof for performing the functions described in this disclosure.

It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

The description of the present disclosure has been presented for purposes of illustration and description, and is not intended to be exhaustive or limited to the disclosure in the form disclosed. Many modifications and variations will be apparent to practitioners skilled in this art. The embodiment was chosen and described in order to best explain the principles of the disclosure and the practical application, and to enable others of ordinary skill in the art to understand the disclosure to design various embodiment with different modifications for particular use.

What is claimed is:

1. A method for controlling a state of an equipment unit performed by an unit controller, comprising:

detecting whether the unit controller communicates with a display panel controller after receiving control data transmitted from a state controller, wherein the control data are also transmitted from the state controller to the display panel controller;

performing an operation corresponding to instruction information transmitted from the display panel controller on the equipment unit in a case where the unit controller communicates with the display panel controller, wherein the instruction information corresponds to a first parsing result obtained by the display panel controller parsing the control data; and parsing the control data to obtain a second parsing result in a case where the unit controller does not communicate with a display panel controller, and performing an operation corresponding to the second parsing result on the equipment unit, wherein the performing the operation corresponding to the second parsing result comprises:

extracting delay information from the second parsing result in a case where the control data are unit encryption instruction information;

performing a delay process corresponding to the delay information, wherein the performing a delay process comprises:

transmitting a current remaining delay information to the display panel controller for the display panel controller to use the remaining delay information to continue the delay process in a case where a communication between the unit controller and the display panel controller is recovered during the delay process; and         locking the equipment unit after receiving a locking instruction transmitted from the display panel controller, wherein the locking instruction is transmitted after the display panel controller finishes the delay process; and     locking the equipment unit after the delay process.

2. The method according to claim 1, wherein the performing the operation corresponding to the second parsing result comprises:

unlocking the equipment unit in a case where the control data are unit decryption instruction information.

3. The method according to claim 1, wherein the performing an operation corresponding to instruction information comprises:

locking the equipment unit in a case of receiving a locking instruction transmitted from the display panel controller; and unlocking the equipment unit in a case of receiving an unlocking instruction transmitted from the display panel controller.

4. The method according to claim 3, wherein the performing an operation corresponding to instruction information comprises:

receiving a remaining delay information transmitted from the display panel controller at a predetermined cycle during the delay process.

5. The method according to claim 4, wherein the performing an operation corresponding to instruction information comprises:

continuing a delay process according to a last received remaining delay information in a case where the unit controller does not communicate with the display panel controller in a process of waiting for receiving the locking instruction transmitted from the display panel controller; and locking the equipment unit after the delay process.

6. A non-transitory computer readable storage medium, wherein the computer readable storage medium stores computer instructions which, when executed by a processor, implement the method of claim 1.

7. A unit controller for controlling the state of an equipment unit, comprising:

a non-transitory memory configured to store instructions;

a processor coupled to the memory and configured to:

detect whether the unit controller communicates with a display panel controller after receiving control data transmitted from a state controller, wherein the control data are also transmitted from the state controller to the display panel controller;

perform an operation corresponding to instruction information transmitted from the display panel controller on the equipment unit in a case where the unit controller communicates with the display panel controller, wherein the instruction information corresponds to a first parsing result obtained by the display panel controller parsing the control data; and parse the control data to obtain a second parsing result in a case where the unit controller does not communicate with a display panel controller, and perform an operation corresponding to the second parsing result on the equipment unit, wherein the perform the operation corresponding to the second parsing result comprises:

extract delay information from the second parsing result in a case where the control data are unit encryption instruction information;

perform a delay process corresponding to the delay information, wherein the performing a delay process comprises:

transmit a current remaining delay information to the display panel controller for the display panel controller to use the remaining delay information to continue the delay process in a case where a communication between the unit controller and the display panel controller is recovered during the delay process; and     lock the equipment unit after receiving a locking instruction transmitted from the display panel controller, wherein the locking instruction is transmitted after the display panel controller finishes the delay process; and lock the equipment unit after the delay process.

8. An equipment unit, comprising:

the unit controller of claim 7;

the state controller configured to transmit control data to the unit controller and the display panel controller;

the display panel controller configured to parse the control data to obtain the first parsing result in a case where the display panel controller communicates with the unit controller, and transmit instruction information corresponding to the first parsing result to the unit controller.

9. The equipment unit according to claim 8, wherein the display panel controller is configured to perform a delay process corresponding to delay information extracted from the control data in a case where the control data are unit encryption instruction information, and transmit the locking instruction to the unit controller after the delay process.

10. The equipment unit according to claim 8, wherein the display panel controller is configured to transmit the unlocking instruction in a case where the control data are unit decryption instruction information.

* * * * *

UNITED STATES PATENT AND TRADEMARK OFFICE
CERTIFICATE OF CORRECTION

| | | |
|---|---|---|
| PATENT NO. | : 11,366,445 B2 | Page 1 of 1 |
| APPLICATION NO. | : 16/962339 | |
| DATED | : June 21, 2022 | |
| INVENTOR(S) | : Wanxing Chen et al. | |

It is certified that error appears in the above-identified patent and that said Letters Patent is hereby corrected as shown below:

On the Title Page

Column 1, Item (73) Assignee, Line 1, Delete "Inc.," and insert -- Inc. of Zhuhai, --

Signed and Sealed this
Sixteenth Day of August, 2022

Katherine Kelly Vidal
*Director of the United States Patent and Trademark Office*